Nov. 10, 1942.        P. E. LOWE        2,301,220
ELECTRONIC TUBE CIRCUIT
Filed Aug. 30, 1941
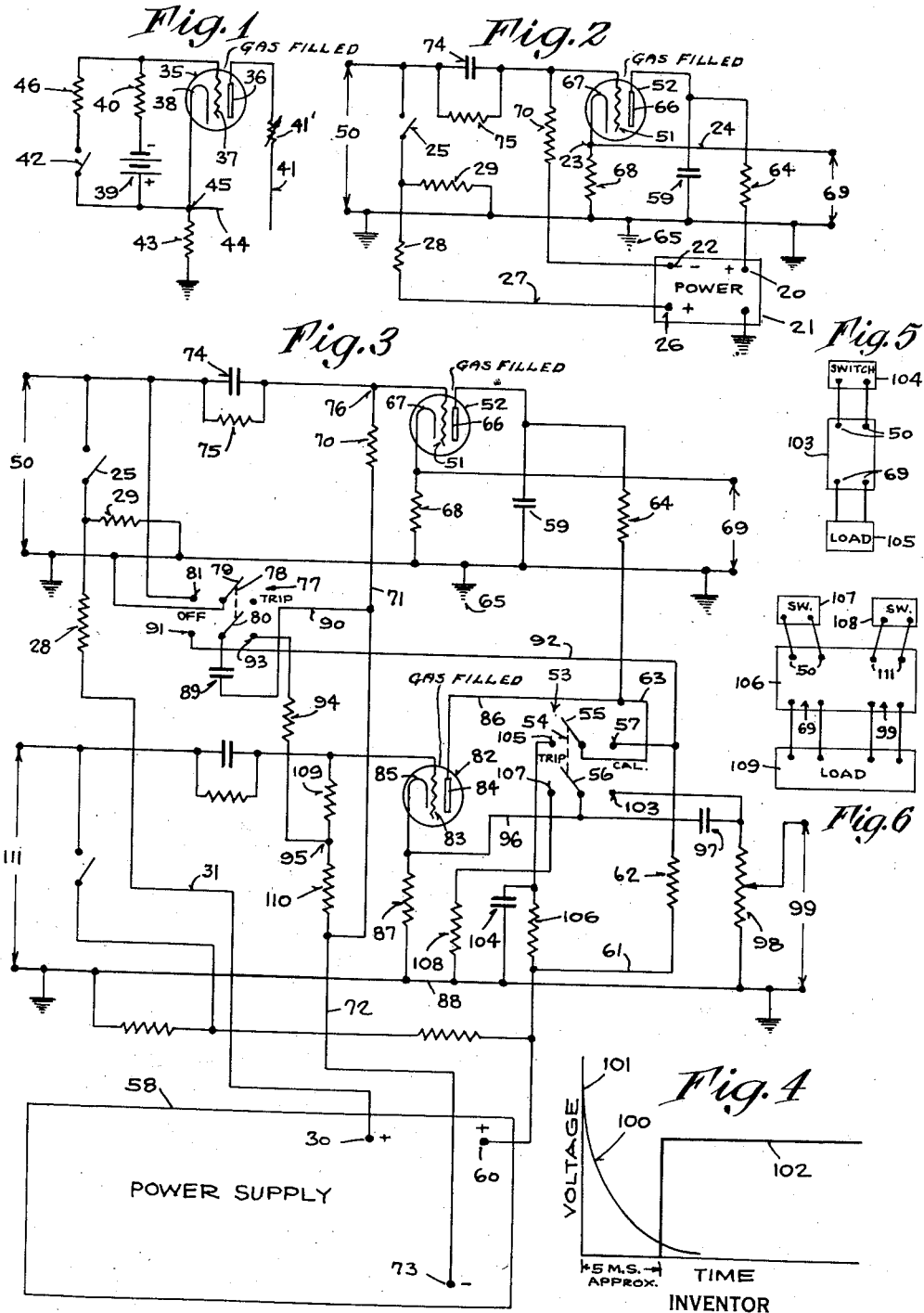
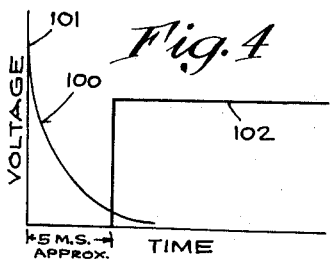
INVENTOR
PAUL E. LOWE
BY
ATTORNEYS Patented Nov. 10, 1942

2,301,220

UNITED STATES PATENT OFFICE 2,301,220

ELECTRONIC TUBE CIRCUIT

Paul E. Lowe, Bridgeport, Conn., assignor to Remington Arms Company, Inc., a corporation of Delaware Application August 30, 1941, Serial No. 408,975

2 Claims. (Cl. 250—27)

This invention relates to circuits and apparatus suitable particularly for calibrating purposes of electrical measuring instruments and for tripping operations for use in various electrical devices. It also relates to a means for producing single impulses to operate apparatus wherein only a single impulse is desired. In the operation of switches of the contact type, there occurs what is called "chattering." This results in a multiplicity of impulses rather than a single impulse, and sensitive electrical instruments or devices will pick up the extraneous impulses which will give undesirable readings or operations. There are many purposes in which a square wave type of output is desired or wherein the voltage reaches its maximum peak almost instantaneously and then continues substantially constant. There are also operations in the calibration of instruments wherein it is required to have a single impulse to start one function and then follow this with a square wave source of potential. The circuits herein described may be used in time measuring instruments, oscillographs, pressure indicators and many other types of electrical apparatus. From the following illustrative description in which are disclosed certain embodiments of the invention as well as means and details of carrying it out, it will become apparent how the foregoing and other objects can be accomplished.

In the drawing:

Fig. 1 is a schematic diagram of one type of circuit which may be used to produce a square wave.

Fig. 2 is a schematic diagram of a portion of a circuit which may be used for producing a single impulse.

Fig. 3 is the diagram of a circuit which may be used for calibrating, a trip circuit or a delayed response, the same numerals being used for the portions identical to Fig. 2.

Fig. 4 is a graph showing one type of operation of the circuit of Fig. 5.

Fig. 5 shows schematically one manner of using the circuit of Fig. 2.

Fig. 6 shows schematically one manner of using the circuit of Fig. 3.

It is desirable in many electrical instruments to use a single impulse and also to employ a square wave. A square wave means one wherein the maximum potential is reached almost instantaneously as shown diagrammatically in curve 102 of Fig. 4. "Square wave" may also be termed "unit function voltage." In previous types of electrical devices for producing a unit function voltage, difficulty has arisen in the obtaining of the instantaneous rise to the constant potential. It is difficult to find a switch which will give instantaneous maximum voltage due to chattering. Most switches with contacts have a certain amount of friction or rubbing of the contacts as they separate. This gives more than a single impulse at the first opening which affects many sensitive electrical instruments adversely. Some switches are purposely made to rub so that the contacts will be kept clean.

One objection to calibrating circuits wherein a chatter occurs is that although a square wave is produced for times in the order of 0.1 second, this action is erratic for approximately the first 10 milliseconds (.010 second) which can be determined by oscillographic studies.

One method of obtaining a square wave is by means of the circuit shown in Fig. 1. A gaseous electronic tube 35 may be employed having a conventional plate 36, control grid 37 and cathode 38. As is well known in this type of tube, the control grid 37 merely serves to start the tube, and conduction will continue in said tube as long as sufficient potential is applied to the plate 36. A battery 39 is provided to bias the control grid 37 through resistance 40 negatively so as normally to keep the tube non-conducting. There is the conventional source of plate potential from lead 41, which supplies the plate-cathode circuit. When it is desired to render the tube conducting, switch 42 may be closed, which will short circuit battery 39 and raise the potential of grid 37 so that the tube will instantly become conducting. Grid 37 then loses control and the plate-cathode circuit is established, giving a source of current which may be maintained constant by suitable devices. In this manner, a flow may be produced giving an instantaneous rise of potential across a suitable load to the maximum value which is maintained constant, thereby obtaining a square wave similar to that shown at 102 in Fig. 4. This potential may be obtained by placing a resistance 43 in the circuit between the cathode and ground. The potential drop across said resistance is impressed upon the desired point by a lead 44 from point 45. Resistance 46 may be employed and given such a size as to cause the proper potential to be placed on 37 when switch 42 is closed. By placing resistance 43 in the cathode circuit between the cathode and ground, the point 45 will be at ground potential until the tube becomes conducting so that the square wave obtained will be above ground potential. If the resistance should be placed in the plate circuit, it will be necessary to take the difference between the potential on 36 when the tube is non-conducting, and the potential drop through the resistance when the tube becomes conducting, which is not as convenient as when the potential of the square wave obtained is above ground. The ratio of the drop to the non-conducting plate potential may also be so small as to be difficult to measure with resultant inaccuracies. By connecting the biasing circuit to point 45, switching transients resulting from operation of switch 42 will not appear across resistance 43 and hence will not be present in the calibrating potential. A variable resistance 41' may be used in the plate circuit if desired.

Referring now to Fig. 2, one portion of the circuit shown in Fig. 3 is disposed. This particular part of the circuit is especially adapted to provide a single impulse at the output terminals in response to an impulse at the input terminals. As has been stated before, many electrical instruments must have only the first impulse impressed thereon and chattering or additional impulses must be prevented from reaching the instrument. One example is the use of a pendulum make and break contact on a plate which is broken by a projectile hitting the plate. The pendulum in this case will frequently bounce several times on the plate giving more than a single impulse. In Fig. 2 the input terminals are indicated at 50 and a gaseous discharge tube at 52 having a grid 51, plate 66 and cathode 67. It is to be understood that the term "cathode" whenever used in this specification means a directly or indirectly heated element. The control element or grid 51 is connected with one of the terminals 50 through condenser 74. There is a high resistance 75 parallel to condenser 74 for the purpose which will be described presently. The plate circuit of tube 52 includes a condenser 59 and a cathode resistance 68. The condenser 59 is charged from the terminal 20 of the power supply shown diagrammatically at 21. The power supply may be any convenient source of current. Because of the presence of the resistance 64, a predetermined time is necessary for the charging of the condenser 59 from its discharged condition. This time constant depends upon the product of the resistance by the capacitance in the circuit. The grid 51 is normally biased negative from terminal 22 through resistance 70. Assuming that the condenser 59 is fully charged when the tube breaks down due to a positive potential on grid 51, condenser 59 will discharge through plate 66, cathode 67, resistance 68 to ground 65. This momentary flow through resistance 68 will place an impulse on output terminals 69 from point 23 through lead 24. The terminals 50 and biasing circuit for the grid 51 are so arranged that the impulse operated switch connected to terminals 50 may be a switch which closes upon the impulse or a switch which opens upon the impulse to be measured, or to which the device is responsive. If the switch is one which closes, the switch 25 is left open, then when the switch closes, a circuit will be completed from terminals 26, line 27, resistance 28, resistance 29 across terminals 50, condenser 74, grid 51, thereby placing the tube in a conductive condition. If a switch is to be used across 50 which opens at the impulse, then switch 25 is closed. Then when the switch opens because of an impulse, a positive potential from terminals 26 through resistance 28, switch 25 will be impressed upon condenser 74 which, in turn, will raise the potential of grid 51 so that the tube will break down. Then when the switch across 50 is again closed, the charge which has been placed on condenser 74 will leak-off through the resistance 75. It is seen that in this circuit a single or the first impulse upon 50 will result in a single discharge of the tube 52 through resistance 68 with a resultant single impulse on output terminals 69. Then any further impulse immediately received at 50 or received before the condenser 59 can recharge will not result in a second impulse at output terminals 69. In this manner a chattering switch does not produce a series of impulses in the output terminals 69 until a predetermined length of time, depending upon the time constant of the charging circuit for the condenser 59. When switch 25 is open, the input circuit may also respond to a positive voltage above the critical biasing value for the tube.

Referring now to Fig. 3, there is shown a circuit which is capable of several uses which will be described. As has been stated in the description of Fig. 2, in a switching circuit or instrument in which it is desirable to have a single impulse, precautions must be taken so as to have only the first impulse perform the desired operations and to eliminate the effect of any chattering of the switch or any of the immediate impulses after the first. An example of a switching circuit which must have only one impulse placed thereon is the chronoscope shown in application S. N. 276,167. In such a chronoscope there are two impulses, one at the beginning and one at the end of the interval to be measured. This interval is quite short so that after the circuit has been turned off there may be other impulses than the original which would give a false reading or would cause damage to the instrument. As described in Fig. 2 the input to the circuit may be placed across terminals 50, which will then appear on grid 51 of tube 52 as just described. The switch shown generally at 53 with a schematic operator 54 for moving both blades 55 and 56 simultaneously may be placed to the right so that blade 55 engages contact 57. A power supply is diagrammatically shown at 58, which may take any desired form, such as a battery or a suitable rectifying device. The charging circuit for condenser 59 will then be from terminal 60, lead 61, resistance 62, contact 57, blade 55, lead 63, resistance 64, condenser 59, and to ground at 65. Then, when tube 52 becomes conducting, condenser 59 will discharge through plate 66, cathode 67, resistance 68, back to the other side of condenser 59. A single impulse will be created across resistance 68, which will appear at the output terminals 69. As the condenser immediately discharges and resistance 64 is made sufficiently high, the tube will extinguish so that only one impulse will be available. With a standard type 885 tube and one-microfarad condenser 59, a lock-out for about one second may be provided. It is also to be noted that when switch 55 is in the trip position that the charging circuit for condenser 59 is from terminal 60, resistance 106, contact 105, switch blade 55 and resistance 64 so that the resistance 106 is added with a consequent increase in the lock-out time. If 106 be made 10 megohms, the lock-out time will be about 7 milli-seconds. It is understood, however, that the values of the condenser 59 and resistance 64 may be made such as to provide the desired lock-out time. The resistance 64 may, in the above example, be 1 megohm.

This resistance must be large enough to prevent continued conduction of tube 52 after the condenser has discharged. The bias for grid 51 may be obtained through resistance 70, lead 71, lead 72, terminal 73. The tripping means for tube 52 may be similar to that described for Fig. 2 if desired. The source of energy for the circuit may be from terminal 30, lead 31 to resistance 28, etc. If the circuit is to be used as a calibrating device, wherein the first impulse is to be obtained at the will of the operator, a switch 77 having a schematically shown operator 78 connecting blades 79 and 80 may be provided. When the device is in the "off" or left position, switch blade 79 will engage contact 81 and provide a short circuit across terminals 50. The switch 25 will be closed as the switch 79 is to be opened to give the first impulse. Upon opening of this circuit a positive potential will appear at 76 and on grid 51, which will cause tube 52 to discharge condenser 59 and provide the desired impulse at terminal 69. As has been stated before, it is frequently desirable to have the first impulse start the operation of some part of an instrument, such as the sweep circuit of an oscillograph, and then provide a square wave to be observed or read on the instrument. A delay between the first impulse and the beginning of the wave gives time to make the proper reading or to observe the same on the cathode ray tube. It is also evident that there are many other purposes for which it may be desired to produce a first impulse followed by a second potential such as a square wave.

A second circuit may be provided having a gaseous tube 82 with a control grid 83, plate 84, cathode 85. Considering that the switch 53 is still in the calibrating or right-hand position, the plate-cathode circuit of tube 82 will be from terminal 60, lead 61, resistance 62, blade 55, lead 63, lead 86, plate 84, cathode 85, resistance 87, back to ground lead 88. The switch blade 80, when in the off or left-hand position before the operation of the first circuit, connects the condenser 89 to the source of supply from terminal 60, lead 61, resistance 62, lead 92, contact 91, blade 80, condenser 89, lead 90, lead 72, back to terminal 73. Then, when the switch 77 is thrown to the trip position or to the right, it will cause the impulse as described to appear on output terminals 69 of the first circuit. Blade 80 will engage contact 93 which will allow condenser 89 to discharge through resistance 94 to point 95, thereby changing the bias on grid 83 so that tube 82 will become conducting, and the plate-cathode circuit thereof energized. The flow through the plate-cathode circuit of tube 82 will cause a potential drop across the cathode resistance 87, which will appear through lead 96, switch blade 56, contact 103, potentiometer 98, thereby causing a square wave to appear across terminals 99 in a manner similar to that described for Fig. 1. The switch 77 may, for example, be of a conventional snap action toggle type, which will pass rapidly over center by spring action after dead center. In this way, there will be an interval of time between the breaking of contact by the switch blade 79 and contact 81 and lead 71, and the making of contact between blade 80 and contact 93 energizing the tube 87. This will depend upon the characteristics of the switch, but can be about five (5) milli-seconds, for example. When the switch 77 is moved to the off position, switch blade 80 will engage contact 91 so that condenser 89 will be connected to the plate 84 of tube 82 and this will depress the potential thereon and extinguish the tube instantly. This will give a negative calibrating pulse for use where such is desired.

Referring now to Fig. 4, which shows voltage against time, the output at terminal 69 will be that indicated by curve 100 where there is an impulse of the full voltage of the condenser at point 101 and which falls off as the condenser discharged. Then about five milliseconds later, or any desirable time, the square wave 102 will appear across terminals 99. It is to be understood, of course, that the value of the potential may be regulated by the potentiometer 98 and will also depend upon the ratio of resistances 62 and 87. If it is desired to have a single impulse at the output terminals 99 similar to that at the output of terminal 69, the switch 53 may be placed to the left or in its "trip" position, whereupon the condenser 104 will be in the plate circuit of tube 82 from contact 105, switch blade 55, lead 63, lead 86, plate 84, cathode 85 and resistance 87. The condenser 104 will be charged similar to condenser 59 from terminal 60, resistance 106 to condenser 104. The switch blade 56 will engage contact 107 so that the discharge of the condenser by tube 82 will be from the condenser 104, contact 105, blade 55, lead 63, lead 86, plate 84, cathode 85, line 96, blade 56, contact 107, resistance 108 to ground. This impulse will appear through condenser 97 across potentiometer 98. The resistance 108 may be made the same value as resistance 66, if desired. A negative bias for 83 may be obtained through resistance 109, resistance 110, line 72, terminal 73.

It is seen, therefore, that when switch 77 is in the trip or right-hand position and switch 53 is in the left-hand or trip position, that when an impulse is placed across terminal 50, a single impulse will appear at terminal 69 regardless of chattering; and that when a second impulse is placed on terminals 111 that a second single impulse will appear across terminals 99 regardless of chattering at 111.

In Fig. 5 there is diagrammatically shown one manner in which the circuit of Fig. 2 may be used. The circuit of Fig. 2 is represented by the box 103 having input terminals 50 and output terminals 69 identical to Fig. 2. Connected to the terminals 50 may be an impulse switch diagrammatically shown at 104. It is to be understood that this switch may be of any suitable type, as described in the preceding specification, wherein a circuit is opened or a circuit is closed by the impulse. Connected to terminals 69 may be any suitable load, diagrammatically shown at 105, such as an instrument or an apparatus requiring a single impulse. Similarly, in Fig. 6, there is schematically shown the circuit of Fig. 3, indicated by the box 106 having input terminals 50 and 111, with output terminals 69 and 99 as shown in Fig. 3. Switching circuits shown diagrammatically at 107 and 108 may be connected to terminals 50 and 111, and a suitable load 109 connected to output terminals 69 and 99. It is to be understood that this load may consist of one device or two separate devices to be operated by the circuit. As has been stated before, one example of a load which may be operated is that of an oscillograph wherein the first impulse may start a sweep circuit, and a second impulse start the square wave to be studied on the oscillograph.

By the present invention, a method and apparatus are provided for giving a single impulse, a single impulse followed by a square or other type wave or a second impulse similar to the first impulse. The chattering effect of a switch is eliminated in the production of a single impulse at the output. The invention is not to be construed as limited to the devices illustrated but is to be extended to all equivalent devices and methods coming within the scope of the appended claims.

What is claimed is:

1. In an electrical instrument calibrating device, a first circuit including a normally nonconducting gaseous discharge tube having a plate, cathode and control grid; a plate-cathode circuit therefor including a condenser, said plate and said cathode in series; a charging circuit connected across said condenser including a resistance so selected as to require a predetermined time to charge the condenser, means to normally bias the control grid below that necessary for conduction of the tube; bias changing means to render the tube conducting and discharge the condenser through said tube; means in the plate-cathode circuit to produce an impulse upon said discharge; a second circuit including a second normally non-conducting gaseous discharge tube having a plate, cathode and control grid, a plate-cathode circuit for said second tube including a second resistance, said plate, said cathode and a source of energy; means to normally bias said second control grid below that necessary for conduction of the second tube; a common control means comprising a double blade switch having two closed positions, the first position rendering the bias changing means of the first tube ineffective; a third circuit including a condenser; means to charge said condenser when said switch is in the first closed position and means to connect the condenser to the second control grid when the switch is in the second closed position, the several circuits being such that opening movement of the switch from the first closed position will produce an impulse at the output of the first circuit and the closing movement to the second position will produce a unit function voltage across the second resistance.

2. In an electrical instrument calibrating device, a first circuit including a normally nonconducting gaseous discharge tube having a plate, cathode and control grid; a plate-cathode circuit therefor including a condenser, said plate and said cathode in series; a charging circuit connected across said condenser including a resistance so selected as to require a predetermined time to charge the condenser; means to normally bias the control grid below that necessary for conduction of the tube; bias changing means to render the tube conducting and discharge the condenser through said tube; means in the plate-cathode circuit to produce an impulse upon said discharge; a second circuit including a second normally non-conducting gaseous discharge tube having a plate, cathode and control grid, a plate-cathode circuit for said second tube including a selectively connectable third circuit including a second resistance, said plate, said cathode and a source of energy to produce a unit function voltage across said resistance; a selectively connectable fourth circuit including a condenser, said plate, said cathode and a charging circuit connected across said condenser including a third resistance, said condenser and third resistance being so selected that a predetermined time is required to charge the condenser thereby preventing a second impulse appearing in said plate cathode circuit until after a predetermined time; a common control means comprising a double blade switch having two closed positions, the first position rendering the bias changing means of the first tube ineffective and changing the bias to render the first tube conducting upon initial movement of the switch from the first position; a fifth circuit including a condenser; means to charge said condenser when said common control switch is in the first position and means to connect the condenser to the second control grid when the switch is in the second closed position to change the bias on the second tube and render the same conducting.

PAUL E. LOWE.